United States Patent
Fernandez Orellana et al.

(10) Patent No.: US 11,941,438 B2
(45) Date of Patent: Mar. 26, 2024

(54) METHOD, ELECTRONIC DEVICE, AND COMPUTER PROGRAM PRODUCT FOR USING VIRTUAL DESKTOP

(71) Applicant: EMC IP Holding Company LLC, Hopkinton, MA (US)

(72) Inventors: Pedro Fernandez Orellana, Shanghai (CN); Qiang Chen, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 460 days.

(21) Appl. No.: 17/398,100

(22) Filed: Aug. 10, 2021

(65) Prior Publication Data
US 2023/0022322 A1  Jan. 26, 2023

(30) Foreign Application Priority Data

Jul. 23, 2021  (CN) .......................... 202110837697.8

(51) Int. Cl.
*G06F 9/46* (2006.01)
*G06F 9/38* (2018.01)
*G06F 9/48* (2006.01)
*G06F 9/50* (2006.01)
*G06F 9/455* (2018.01)

(52) U.S. Cl.
CPC .......... *G06F 9/4881* (2013.01); *G06F 9/3836* (2013.01); *G06F 9/4856* (2013.01); *G06F 9/5077* (2013.01); *G06F 9/45558* (2013.01); *G06F 2009/45579* (2013.01)

(58) Field of Classification Search
CPC .... G06F 9/4881; G06F 9/3836; G06F 9/4856; G06F 9/5077; G06F 9/45558; G06F 2009/45579
See application file for complete search history.

(56) References Cited

PUBLICATIONS

Wikipedia, "Desktop Virtualization," https://en.wikipedia.org/wiki/Desktop_virtualization, Jun. 7, 2021, 5 pages.
Vmware, "Virtual Desktop Infrastructure (VDI)" https://www.vmware.com/topics/glossary/content/virtual-desktop-infrastructure-vdi, Accessed Aug. 10, 2021, 8 pages.
Vmware, "Desktop as a Service (DaaS)" https://www.vmware.com/topics/glossary/content/desktop-as-a-service, Accessed Aug. 10, 2021, 7 pages.
Wikipedia, "Google Stadia," https://en.wikipedia.org/wiki/Google_Stadia, Aug. 2, 2021, 15 pages.

*Primary Examiner* — Gregory A Kessler
(74) *Attorney, Agent, or Firm* — Ryan, Mason & Lewis, LLP

(57) ABSTRACT

Embodiments of the present disclosure provide a method, an electronic device, and a computer program product for using a virtual desktop. A method in one embodiment includes receiving, at a first edge node in a plurality of edge nodes, an instruction from a first set of input devices in a plurality of peripheral devices. The instruction is for use of a first virtual desktop deployed on the first edge node. The method further includes: using the first virtual desktop based on the instruction by using resources at the first edge node. The method further includes: sending data to an output device in the plurality of peripheral devices, wherein the data is associated with the use of the first virtual desktop. The solution for using a virtual desktop of the present application enables the use of a virtual desktop using resources at an edge node without requiring a client.

20 Claims, 6 Drawing Sheets

METHOD, ELECTRONIC DEVICE, AND COMPUTER PROGRAM PRODUCT FOR USING VIRTUAL DESKTOP

RELATED APPLICATION(S)

The present application claims priority to Chinese Patent Application No. 202110837697.8, filed Jul. 23, 2021, and entitled "Method, Electronic Device, and Computer Program Product for Using Virtual Desktop," which is incorporated by reference herein in its entirety.

FIELD

Embodiments of the present disclosure relate to the field of computers and, in particular, to a method, an electronic device, and a computer program product for using a virtual desktop.

BACKGROUND

Virtual desktops can be used to enable remote dynamic access to desktop systems. For example, virtual desktops can be used to access files, install and run applications, etc. Typically, a user uses a virtual desktop through a client. For example, the user can access the virtual desktop using an application or browser running on the client. However, computational processing performed when using the virtual desktop is usually done using resources of a remote server, so there is a waste of hardware and software resources of the client.

SUMMARY

In a first aspect of the present disclosure, a method for using virtual desktops is provided. The method includes: receiving, at a first edge node in a plurality of edge nodes, an instruction from a first set of input devices in a plurality of peripheral devices. The instruction is for use of a first virtual desktop deployed on the first edge node. The method further includes: using the first virtual desktop based on the instruction by using resources at the first edge node. The method further includes: sending data to an output device in the plurality of peripheral devices, wherein the data is associated with the use of the first virtual desktop.

In a second aspect of the present disclosure, an electronic device is provided. The electronic device includes a processor and a memory coupled to the processor, the memory having instructions stored therein which, when executed by the processor, cause the device to execute actions. The actions include: receiving, at a first edge node in a plurality of edge nodes, an instruction from a first set of input devices in a plurality of peripheral devices. The instruction is for use of a first virtual desktop deployed on the first edge node. The actions further include: using the first virtual desktop based on the instruction by using resources at the first edge node. The actions further include: sending data to an output device in the plurality of peripheral devices, wherein the data is associated with the use of the first virtual desktop.

In a third aspect of the present disclosure, a computer program product is provided that is tangibly stored on a computer-readable medium and includes machine-executable instructions, wherein the machine-executable instructions, when executed, cause a machine to perform the method according to the first aspect.

In embodiments of the present disclosure, a solution for using a virtual desktop of the present application enables the use of a virtual desktop using resources at an edge node without requiring a client, thereby reducing hardware resource consumption and maintenance costs and providing low-latency use of a virtual desktop.

This Summary is provided to introduce the selection of concepts in a simplified form, which will be further described in the Detailed Description below. The Summary is neither intended to identify key features or main features of the embodiments of the present disclosure, nor intended to limit the scope of the present disclosure.

BRIEF DESCRIPTION OF THE DRAWINGS

The above and other objectives, features, and advantages of embodiments of the present disclosure will become more apparent from the description below of additional details of example embodiments of the present disclosure in combination with the accompanying drawings. In the example embodiments of the present disclosure, the same reference numerals generally represent the same parts.

DETAILED DESCRIPTION

Figure 1:
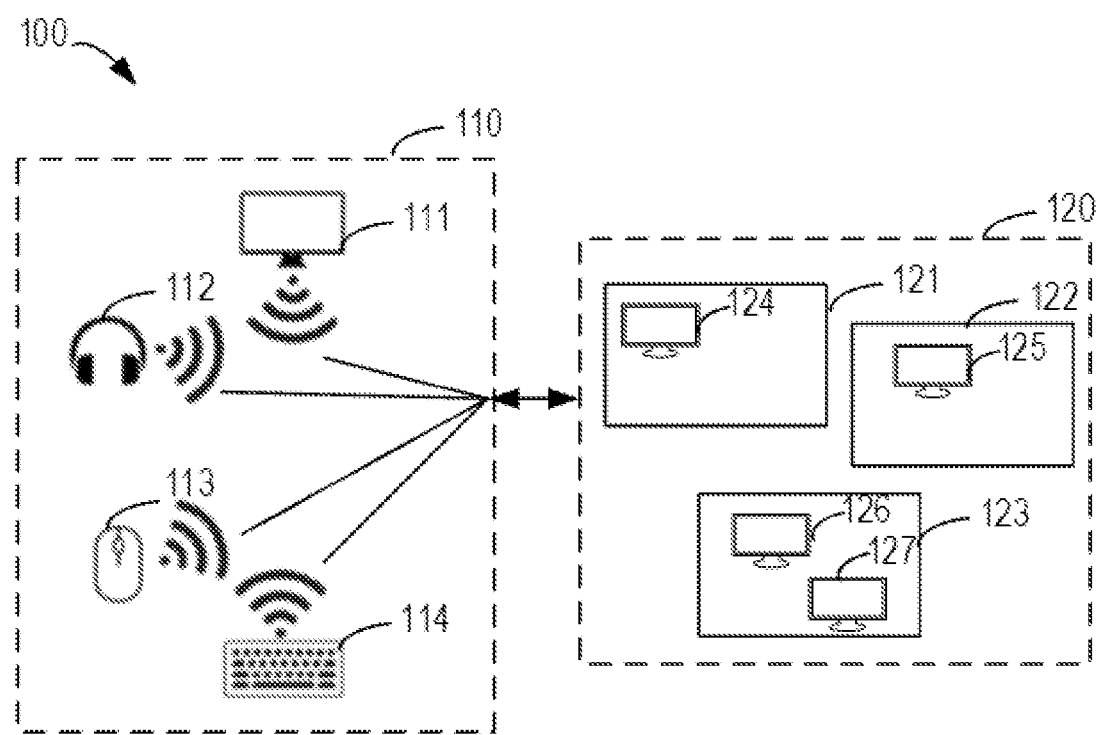
FIG. 1 illustrates a schematic diagram of an environment in which embodiments of the present disclosure can be implemented.

The principles of the embodiments of the present disclosure will be described below with reference to several example embodiments shown in the accompanying drawings. Although illustrative embodiments of the present disclosure are illustrated in the accompanying drawings, it should be understood that these embodiments are described only to enable those skilled in the art to better understand and then implement the embodiments of the present disclosure, and are not intended to impose any limitation to the scope of the present disclosure.

The term "include" and variants thereof used herein indicate open-ended inclusion, that is, "including but not limited to." Unless specifically stated, the term "or" means "and/or." The term "based on" means "based at least in part on." The terms "an example embodiment" and "some embodiments" mean "at least one example embodiment." The term "another embodiment" indicates "at least one additional embodiment." The terms "first," "second," and the like may refer to different or identical objects. Other definitions, both explicit and implicit, may be included below.

As mentioned above, computational processing performed when using the virtual desktop is usually done using resources of a remote server, so there is a waste of hardware and software resources of the client. Although the use of thin clients and zero clients has been proposed to access virtual desktops, these clients still need to possess local computing resources, storage resources, and so on. In addition, it is very difficult to manage and maintain different clients and programs for use of virtual desktops on the corresponding clients. In addition, since it is necessary to send data to remote servers (e.g., cloud data center servers) for computational processing, this may result in higher consumption of network resources. In this case, it is difficult for conventional solutions for using virtual desktops to achieve fast response to user interaction, thus damaging user experience.

Illustrative embodiments of the present disclosure provide a solution for using virtual desktops. The solution includes: receiving, at a first edge node in a plurality of edge nodes, an instruction from a first set of input devices in a plurality of peripheral devices. The instruction is for use of a first virtual desktop deployed on the first edge node. The solution further includes: using the first virtual desktop based on the instruction by using resources at the first edge node. The solution further includes: sending data to an output device in the plurality of peripheral devices, wherein the data is associated with the use of the first virtual desktop. In this way, the use of a virtual desktop can be enabled using resources at an edge node without requiring a client, thereby reducing hardware resource consumption and maintenance costs and providing low-latency use of a virtual desktop.

The basic principles and several example embodiments of the present disclosure are described below with reference to FIGS. 1 to 6. It should be understood that these example embodiments are given only to enable those skilled in the art to better understand and thus implement the embodiments of the present disclosure, and are not intended to limit the scope of the present disclosure in any way.

FIG. 1 illustrates environment 100 in which embodiments of the present disclosure can be implemented. As shown in FIG. 1, environment 100 includes a plurality of peripheral devices 110 and a plurality of edge nodes 120. There are communication connections between the plurality of peripheral devices 110 and the plurality of edge nodes 120. The plurality of peripheral devices 110 can communicate with the plurality of edge nodes 120 using wireless communication. For example, the plurality of peripheral devices 110 may have 5G, WiFi 6, or Ethernet communication interfaces to enable communication with the plurality of edge nodes 120. There may also be communication connections among the plurality of peripheral devices 110.

The plurality of peripheral devices 110 may include input devices and output devices. For example, the plurality of peripheral devices 110 may include display 111 and headset 112 as output devices and mouse 113 and keyboard 114 as input devices. The plurality of peripheral devices 110 may be peripheral devices associated with different users (not shown). For example, display 111 and mouse 113 may be peripheral devices associated with a first user. Headset 112 and keyboard 114 may be peripheral devices associated with a second user. It should be understood that the same peripheral devices may be associated with different users. For example, multiple users can operate the same peripheral device separately at different times. The plurality of peripheral devices 110 may be located in different locations. For example, a first set of peripheral devices in the plurality of peripheral devices 110 may be located in an office area; and a second set of peripheral devices may be located at home.

The plurality of edge nodes 120 may be nodes for edge computing. In other words, the plurality of edge nodes 120 may be a platform for providing resources such as storage resources, computing resources, network bandwidth, etc., in the vicinity of the user. The levels of resources at the plurality of edge nodes 120 may be different. The geographic locations of the plurality of edge nodes 120 may be different. By processing user data directly at the plurality of edge nodes 120, the consumption of network resources caused by transferring the user data to the cloud for processing can be reduced, thereby reducing latency. Direct processing of user data at the plurality of edge nodes 120 can also improve data security and privacy. In some embodiments, the plurality of edge nodes 120 may be associated with a base station of a network service provider. For example, the edge nodes can be deployed on the base station side. In particular, the edge nodes can be deployed on the 5G distributed base station side to enable high-quality communication of the plurality of edge nodes 120 with the plurality of peripheral devices 110. In some embodiments, the plurality of edge nodes 120 may be a platform constructed on an enterprise intranet. For example, a first edge node can be constructed in a first office area to process user data at the first office area, and a second edge node can be constructed in a second office area to process user data at the second office area. There may be communication connections among the plurality of edge nodes 120. For example, communication can be conducted via a network of a network service provider or an enterprise intranet.

FIG. 1 illustrates an example of the plurality of edge nodes 120. As illustrated in the figure, the plurality of edge nodes 120 may include first edge node 121, second edge node 122, and third edge node 123. At least one virtual desktop can be deployed on each edge node. For example, first virtual desktop 124 can be deployed on first edge node 121. Second virtual desktop 125 can be deployed on second edge node 122. Third virtual desktop 126 and fourth virtual desktop 127 can be deployed on third edge node 123. A plurality of virtual desktops on the same edge node can be used by different users. For example, third edge node 123 can receive a first instruction from an input device associated with the first user and use third virtual desktop 126 based on the first instruction. Third edge node 123 can also receive a second instruction from an input device associated with a second user and use fourth virtual desktop 127 based on the second instruction. A plurality of virtual desktops on the same edge node can also be used by the same user for different purposes. The scope of the present disclosure is not limited in this regard.

It should be understood that environment 100 shown in FIG. 1 is merely an example and should not constitute any limitation to the functions and scope of the implementations described in the present disclosure. For example, environment 100 may also include a cloud, and the cloud may communicate with at least one of the plurality of peripheral devices 110 and the plurality of edge nodes 120. The cloud can host a scheduling service for managing and scheduling at least one of the plurality of peripheral devices 110 and the plurality of edge nodes 120.

Figure 2:
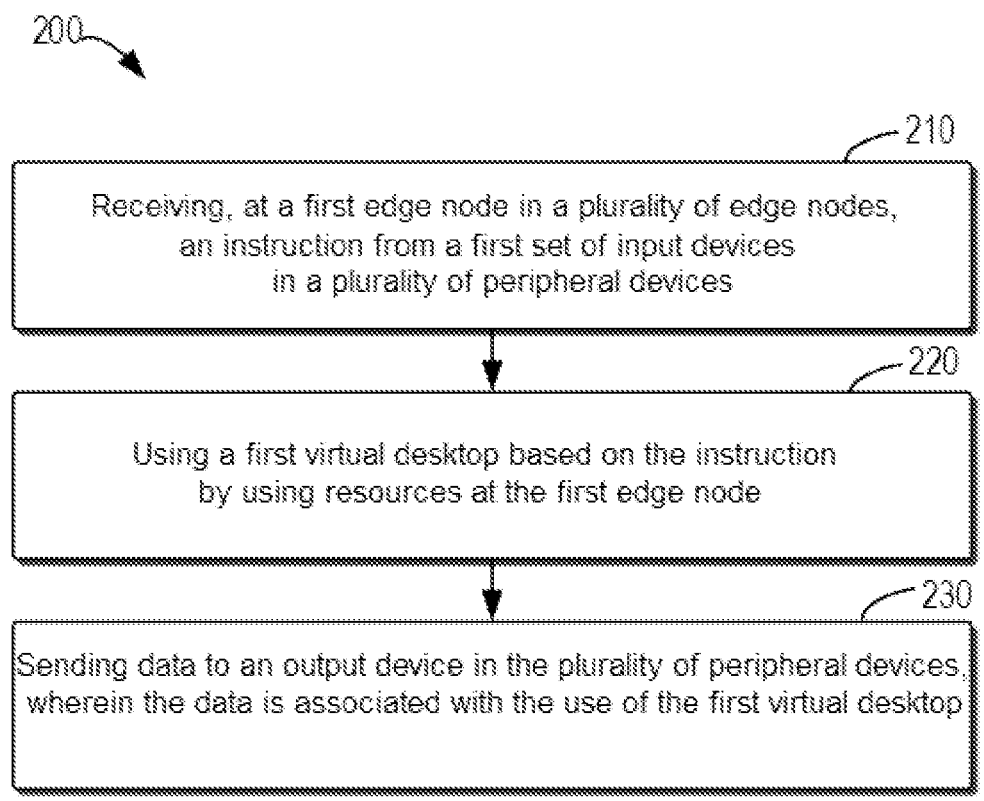
FIG. 2 illustrates a flow chart of an example method for using a virtual desktop according to some embodiments of the present disclosure.

FIG. 2 illustrates a flow chart of example method 200 for using a virtual desktop according to some embodiments of the present disclosure. Method 200 can be implemented, for example, in environment 100 as shown in FIG. 1. It should be understood that method 200 may also include additional actions not shown and/or may omit actions shown, and the scope of the present disclosure is not limited in this regard. Method 200 is described below with reference to FIGS. 2-3.

At block 210, an instruction is received at first edge node 121 in the plurality of edge nodes 120 from a first set of input devices in the plurality of peripheral devices 110. The instruction is for use of first virtual desktop 124 deployed on first edge node 121. The instruction may include information for describing the use of first virtual desktop 124. For example, the instruction may include information describing a task to be performed on first virtual desktop 124. The instruction may also include identification of devices. For example, the instruction may include a unique identification code for each input device in the first set of input devices.

The first set of input devices may be associated with the same user. Alternatively, the first set of input devices may be associated with a plurality of users. In some embodiments, the first set of input devices may be input devices in the plurality of peripheral devices 110 that are proximate to first edge node 121. For example, the first set of input devices can actively send an instruction to the closest first edge node 121 for use of first virtual desktop 124 on first edge node 121.

In some other embodiments, it can be determined by the scheduling service which input devices in the plurality of peripheral devices 110 send instructions to first edge node 121. The scheduling service can determine an association between the peripheral devices and the edge nodes based on the geographic locations of the plurality of edge nodes 120, the geographic locations of the plurality of peripheral devices 110, the levels of resources at the plurality of edge nodes 120, and a predetermined protocol, among other things. Based on the association, the input devices in the plurality of peripheral devices 110 can send instructions to corresponding edge nodes, that is, the plurality of edge nodes 120 can receive the instructions from the corresponding peripheral devices.

The scheduling service can be deployed on at least one edge node in the plurality of edge nodes 120. For example, it can be determined by a scheduling service deployed on first edge node 121 that first edge node 121 receives an instruction from the first set of input devices. Alternatively, it can be determined by a scheduling service deployed on second edge node 122 that first edge node 121 receives an instruction from the first set of input devices. Through communication between second edge node 122 and first edge node 121, first edge node 121 can determine to receive an instruction from the first set of input devices. Alternatively or additionally, the scheduling service can be deployed in a cloud external to the plurality of edge nodes 120. For example, first edge node 121 can receive an indication from the cloud, thereby determining to receive an instruction from the first set of input devices.

At block 220, first edge node 121 uses first virtual desktop 124 based on the instruction by using the resources at first edge node 121. Examples of the resources at first edge node 121 may include computing resources, storage resources, network bandwidth, etc. Use of first virtual desktop 124 may include operations such as accessing files, installing and running applications, etc., and the scope of the present disclosure is not limited in this regard. As described above, first edge node 121 can receive an instruction from a plurality of peripheral devices associated with a plurality of users. In such a case, first edge node 121 can process instructions to distinguish between instructions from different users, thereby using first virtual desktop 124 based on instructions from the same user. The details of processing an instruction will be described below in connection with FIG. 3.

Figure 3:
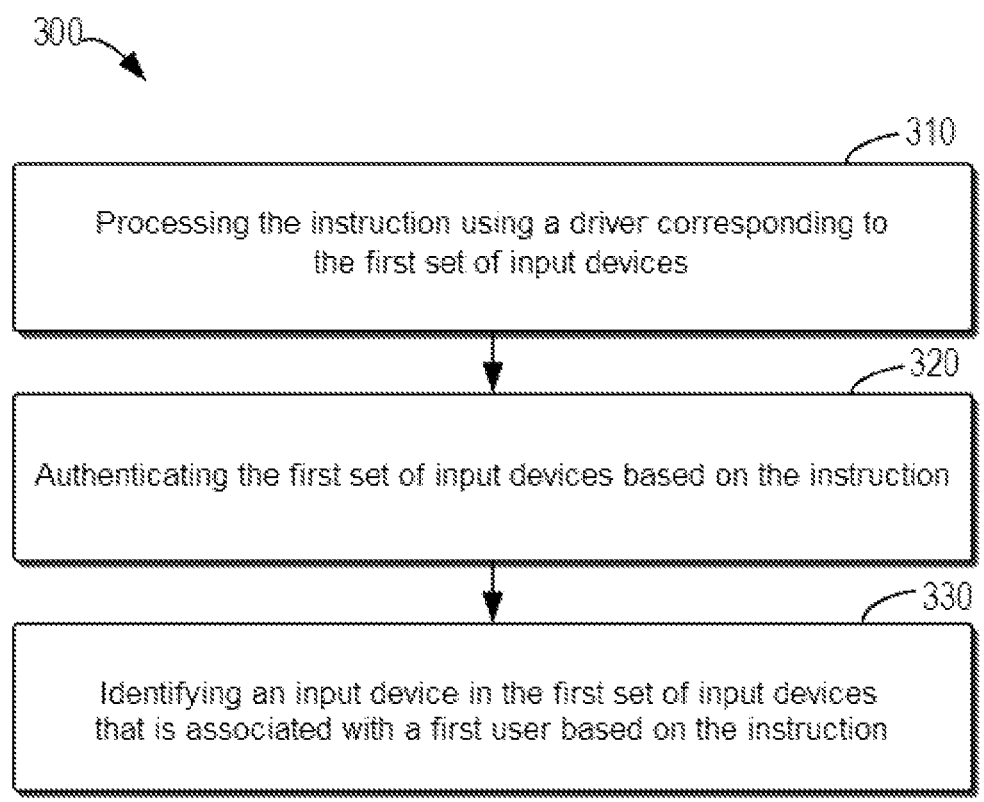
FIG. 3 illustrates a flow chart of an example method for processing an instruction according to some embodiments of the present disclosure.

FIG. 3 illustrates a flow chart of example method 300 for processing an instruction according to some embodiments of the present disclosure. Method 300 can be implemented, for example, in environment 100 as shown in FIG. 1. It should be understood that method 300 may also include additional actions not shown and/or may omit actions shown, and the scope of the present disclosure is not limited in this regard.

At block 310, first edge node 121 can process the instruction using a driver corresponding to the first set of input devices. First edge node 121 can determine the type of the input device based on the information used to identify the input device in the instruction. Thereafter, first edge node 121 can run the driver corresponding to the input device to process the instruction from that input device.

At block 320, first edge node 121 can authenticate the first set of input devices based on the instruction. A variety of ways can be utilized to authenticate the first set of input devices. The scope of the present disclosure is not limited in this regard. For example, keyboard 114 can be authenticated based on a password entered via keyboard 114 in the instruction. As another example, a microphone as an input device can be authenticated based on a specific pass code received via the microphone in the instruction.

At block 330, first edge node 121 can identify an input device in the first set of input devices that is associated with a first user based on the instruction. The first set of input devices can identify the input device associated with the first user based on information for identifying the input device and information for identifying the user in the instruction. For example, keyboard 114 may be associated with the first user based on a user name of the first user entered via keyboard 114 in the instruction. As another example, the microphone may be associated with the first user based on the voiceprint feature of the voice of the first user received via the microphone in the instruction.

In this way, first edge node 121 can classify the instructions sent by the plurality of users via the first set of input devices, thereby aggregating and synchronizing instructions from the same user. Based on this, first edge node 121 can use first virtual desktop 124 according to each user's needs, thereby ensuring the security and privacy of the user data.

With continued reference to FIG. 2, at block 230, first edge node 121 sends data to an output device in the plurality of peripheral devices 110, wherein the data is associated with the use of first virtual desktop 124. The data may include interface data for first virtual desktop 124 for use, for example, to display the interface of first virtual desktop 124 in real time on display 111. Alternatively or additionally, the data may include running results of using first virtual desktop 124. For example, the data may include audio data of a song to be played as directed by the instruction, so as to be presented to the user via headset 112.

In addition, first edge node 121 can also authenticate the output device. For example, first edge node 121 can authenticate the output device by sending an authentication question to the output device and receiving an authentication response from the output device. First edge node 121 can identify an output device in the output devices that is associated with the first user, thereby sending data for the first user to the output device associated with the first user.

A solution for using a virtual desktop is described above in connection with FIG. 1-3. Based on this solution, the use of a virtual desktop can be enabled using resources at an edge node without requiring a client, thereby reducing hardware resource consumption and maintenance costs and providing low-latency use of a virtual desktop.

Figure 4:
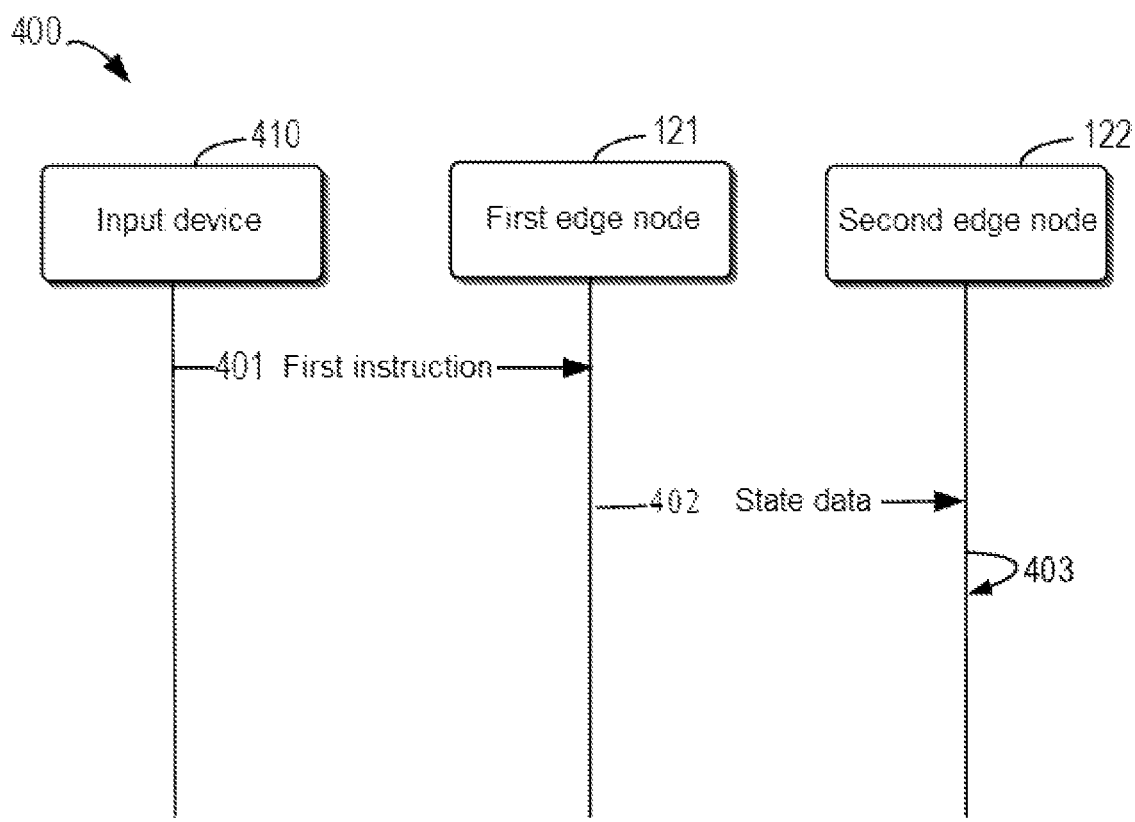
FIG. 4 illustrates a flow chart of migrating a virtual desktop according to some embodiments of the present disclosure.

In some embodiments, the virtual desktop can also be migrated between the plurality of edge nodes 120, thereby enabling flexible use of the virtual desktop and further reducing latency. FIG. 4 illustrates a flow chart 400 of migrating a virtual desktop according to some embodiments of the present disclosure. It should be understood that the example of FIG. 4 is merely schematic and does not limit the scope of the present disclosure.

At 401, input device 410 can send a first instruction to first edge node 121. Input device 410 may be any suitable input device in the plurality of peripheral devices 110, such as keyboard 114, etc. The first instruction can be for use of first virtual desktop 124 deployed on first edge node 121.

At 402, in response to the level of the resources at first edge node 121 being below a first threshold, first edge node 121 can send state data of first virtual desktop 124 that is being used to second edge node 122. The state data is used to reconstruct at second edge node 122 second virtual desktop 125 identical to first virtual desktop 124. The state data may include all of the data of first virtual desktop 124 in its current state, including but not limited to interface data, application data, user data, etc. Second edge node 122 may be an edge node with a high level of current resources.

In some embodiments, the first threshold may be a preset fixed value. In some embodiments, the first threshold can be determined in a comprehensive and dynamic manner based on the geographic locations of the plurality of edge nodes 120, the geographic locations of the plurality of peripheral devices 110, the levels of resources at the plurality of edge nodes 120, the loads on the resources at the plurality of edge nodes 120, and a predetermined protocol, among other things. For example, the first threshold can be determined based on the quality of service specified in a predetermined service level agreement (SLA).

Similarly, whether the level of resources at first edge node 121 is below the first threshold can be determined by a scheduling service deployed on at least one edge node in the plurality of edge nodes 120 or on the cloud. Alternatively or additionally, it may be determined by another service that the level of resources at first edge node 121 is below the first threshold. For example, a management service separate from the scheduling service can be utilized to make the determination. The management service can also be deployed on at least one edge node in the plurality of edge nodes 120 or on the cloud.

In some embodiments, the migration of first virtual desktop 124 on first edge node 121 to second edge node 122 can be determined by the scheduling service or the management service. Which edge node in the plurality of edge nodes 120 to migrate first virtual desktops 124 on first edge node 121 to can be determined in a comprehensive and dynamic manner based on the geographic locations of the plurality of edge nodes 120, the geographic locations of the plurality of peripheral devices 110, the levels of resources at the plurality of edge nodes 120, the loads on the resources at the plurality of edge nodes 120, and a predetermined protocol, among other things, so as to achieve a lower latency and better user experience.

In some embodiments, first edge node 121 can also send state data of first virtual desktop 124 that is being used to the cloud (not shown in FIG. 4). First edge node 121 can periodically send the state data of first virtual desktop 124 that is being used to the cloud. In this case, in response to the level of the resources at first edge node 121 being below the first threshold, second edge node 122 can download the state data of first virtual desktop 124 from the cloud, thereby reconstructing second virtual desktop 125 identical to first virtual desktop 124 at second edge node 122 for continued use by the user.

At 403, second edge node 122 can reconstruct second virtual desktop 125 identical to first virtual desktop 124 in the current state based on the state data. In other words, migration of first virtual desktop 124 between first edge node 121 and second edge node 122 can be achieved.

In some embodiments, in response to having constructed second virtual desktop 125 identical to first virtual desktop 124 at second edge node 122, input device 410 can send subsequent instructions to second edge node 122 instead of first edge node 121 to continue using second virtual desktop 125 deployed on second edge node 122. In addition, second edge node 122 can send usage data associated with the use of second virtual desktop 125 to the output device, thereby providing the usage data to the user via the output device. By migrating the virtual desktop from first edge node 121 with a lower current resource level to second edge node 122 with a higher current resource level, lower latency and better user experience can be provided.

Figure 5:
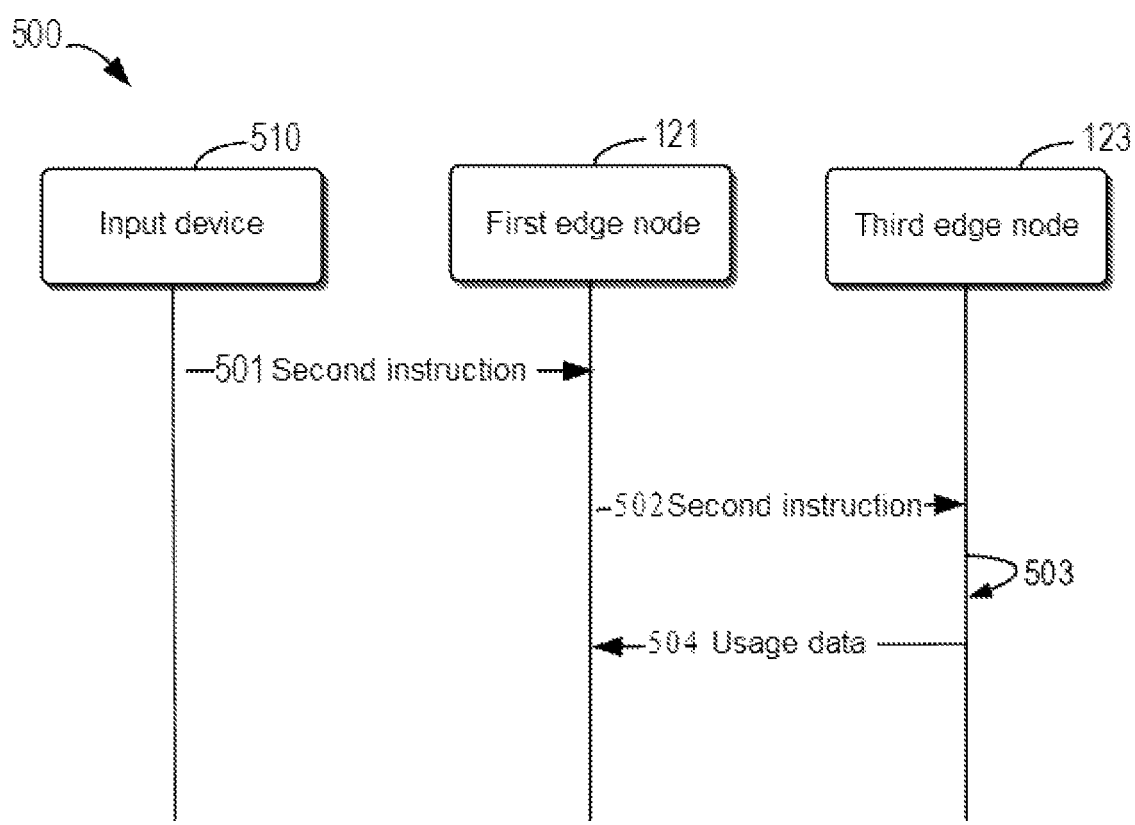
FIG. 5 illustrates a flow chart of redirecting an instruction according to some embodiments of the present disclosure.

In some embodiments, flexible use of the virtual desktop and further reduction in latency can also be achieved by redirecting instructions sent via input devices. FIG. 5 illustrates a flow chart 500 of redirecting an instruction according to some embodiments of the present disclosure. It should be understood that the example of FIG. 5 is merely schematic and does not limit the scope of the present disclosure.

At 501, in response to the quality of communication between third edge node 123 and input device 510 being below a second threshold, input device 510 can send a second instruction to first edge node 121. The second instruction is for use of third virtual desktop 126 deployed on third edge node 123. Input device 510 may be different from input device 410. For example, input device 510 may be closer to third edge node 123 than input device 410. Input device 510 may be an input device that is determined to send the second instruction to third edge node 123 so as to use third virtual desktop 126 on third edge node 123. In this case, in response to the quality of communication between third edge node 123 and input device 510 being below the second threshold, input device 510 can send the second instruction to first edge node 121 instead of sending the second instruction to third edge node 123.

Similarly, the second threshold can be determined based on the scheduling service and/or the management service. It can be determined whether the quality of communication between third edge node 123 and input device 510 is below the second threshold value based on the scheduling service and/or the management service. The sending of the second instruction to first edge node 121 can be determined based on the scheduling service and/or the management service. The specific details will not be repeated here.

At 502, first edge node 121 can send the second instruction to third edge node 123. First edge node 121 can send the second instruction to third edge node 123 via any suitable communication connection. For example, first edge node 121 can send the second instruction to third edge node 123 via a communication connection between base stations. As another example, first edge node 121 can send the second instruction to third edge node 123 via an enterprise intranet.

At 503, third edge node 123 can use third virtual desktop 126 on third edge node 123 based on the received second instruction. This step 503 may be similar to step 220 in FIG. 2 and step 403 in FIG. 4, and the details will not be repeated here.

At 504, third edge node 123 can send usage data associated with the use of third virtual desktop 126 to first edge node 121. First edge node 121 can send the usage data to an output device, thereby providing the usage data to the user via the output device.

Alternatively, when the quality of communication between third edge node 123 and input device 510 is restored to above the second threshold, third edge node 123 can send the usage data associated with the use of third virtual desktop 126 directly to the output device instead of sending it to first edge node 121.

In this manner, when the quality of communication between input device 510 and a predetermined edge node (e.g., third edge node 123) is not high, the forwarding of instructions can be achieved by redirecting the instructions to another edge node (e.g., first edge node 121), so that the user can continuously use the same virtual desktop (e.g., third virtual desktop 126). Based on the redirection of instructions, flexible use of virtual desktops can be achieved and low latency can be ensured.

In some embodiments, the redirection of instructions and the migration of virtual desktops can also be used in combination. For example, when the level of resources at third edge node 123 is below a third threshold, the scheduling service and/or management service can determine to migrate third virtual desktop 126 on third edge node 123 to first edge node 121. In this way, input device 510 can send an instruction directly to first edge node 121 to use the virtual desktop on first edge node 121 that is reconstructed based on third virtual desktop 126, which can reduce latency and improve user experience.

Figure 6:
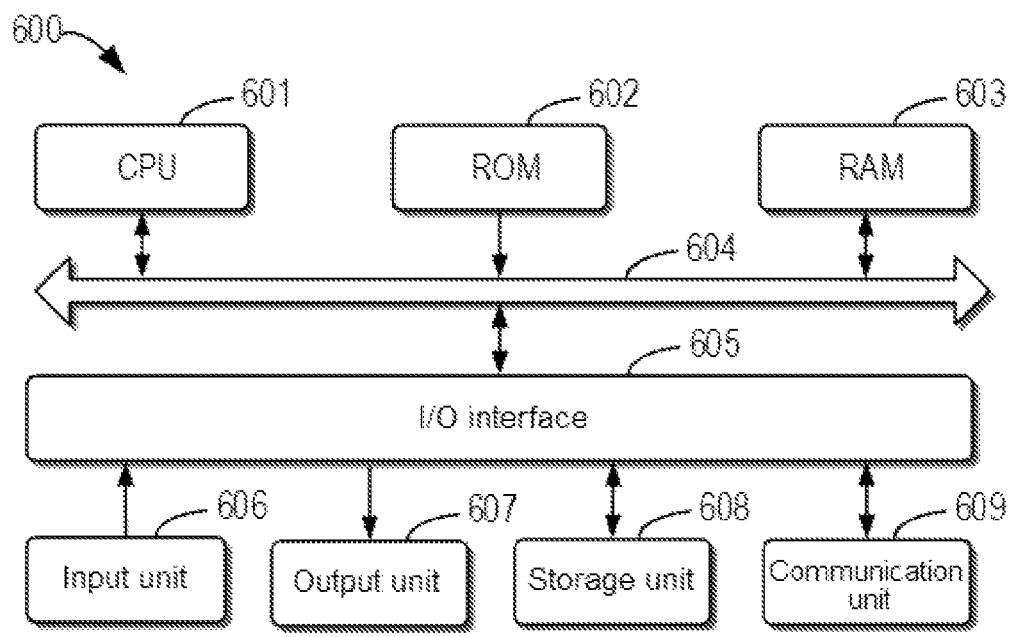
FIG. 6 illustrates a block diagram of an example computing device that can be used to implement embodiments of the present disclosure.

FIG. 6 illustrates a schematic block diagram of example device 600 that can be used to implement the embodiments of the present disclosure. For example, device 600 can be implemented at environment 100 as shown in FIG. 1. As shown in FIG. 6, device 600 includes central processing unit (CPU) 601 that may perform various appropriate actions and processing according to computer program instructions stored in read-only memory (ROM) 602 or computer program instructions loaded from storage unit 608 to random access memory (RAM) 603. Various programs and data required for the operation of device 600 may also be stored in RAM 603. CPU 601, ROM 602, and RAM 603 are connected to each other through bus 604. Input/output (I/O) interface 605 is also connected to bus 604.

Multiple components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/data with other devices via a computer network, such as the Internet, and/or various telecommunication networks.

The various processes and processing described above, for example, method 200 and method 300, can be performed by CPU 601. For example, in some embodiments, method 200 and method 300 may be implemented as a computer software program that is tangibly included in a machine-readable medium such as storage unit 608. In some embodiments, part or all of the computer program may be loaded and/or installed onto device 600 via ROM 602 and/or communication unit 609. One or more actions of method 200 described above may be performed when the computer program is loaded into RAM 603 and executed by CPU 601.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), an SRAM, a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object oriented programming languages, such as Smalltalk, C++, and the like, and conventional procedural programming languages, such as the "C" language or similar programming languages. The computer-readable program instructions may be executed entirely on a user computer, or partly on a user computer, or as a stand-alone software package, or partly on a user computer and partly on a remote computer, or entirely on a remote computer or server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described here with reference to flow charts and/or block diagrams of the method, the apparatus (system), and the computer program product implemented according to the embodiments of the present disclosure. It should be understood that each block of the flow charts and/or the block diagrams and combinations of blocks in the flow charts and/or the block diagrams may be implemented by the computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flow charts as well as a combination of blocks in the block diagrams and/or flow charts may be implemented using a special hardware-based system that executes specified functions or actions, or using a combination of special hardware and computer instructions.

Example embodiments of the present disclosure have been described above. The above description is illustrative, rather than exhaustive, and is not limited to the disclosed various embodiments. Numerous modifications and alterations are apparent to those of ordinary skill in the art without departing from the scope and spirit of the illustrated embodiments. The selection of terms used herein is intended to best explain the principles and practical applications of the various embodiments or the improvements to technologies on the market, so as to enable persons of ordinary skill in the art to understand the embodiments disclosed here.

What is claimed is:

1. A method for using a virtual desktop, comprising:
   receiving, at a first edge node in a plurality of edge nodes, an instruction from a first set of input devices in a plurality of peripheral devices, wherein the instruction is for use of a first virtual desktop deployed on the first edge node;
   using the first virtual desktop based on the instruction by using resources at the first edge node; and
   sending data to an output device in the plurality of peripheral devices, wherein the data is associated with the use of the first virtual desktop.

2. The method according to claim 1, wherein using the first virtual desktop based on the instruction comprises at least one of:
   processing the instruction using a driver corresponding to the first set of input devices;
   authenticating the first set of input devices based on the instruction; and
   identifying an input device in the first set of input devices that is associated with a first user based on the instruction.

3. The method according to claim 1, further comprising:
   sending, in response to a level of the resources at the first edge node being below a first threshold, state data of the first virtual desktop that is being used to a second edge node in the plurality of edge nodes, wherein the state data is used to reconstruct at the second edge node a second virtual desktop identical to the first virtual desktop.

4. The method according to claim 3, further comprising:
   sending the state data of the first virtual desktop that is being used to a cloud.

5. The method according to claim 3, further comprising:
   receiving from a scheduling service an indication that the level of the resources at the first edge node is below the first threshold, wherein the scheduling service is deployed on at least one edge node in the plurality of edge nodes or on a cloud external to the plurality of edge nodes.

6. The method according to claim 1, further comprising:
   in response to a quality of communication between a third edge node in the plurality of edge nodes and a second set of input devices in the plurality of peripheral devices being below a second threshold, receiving a second instruction from the second set of input devices, wherein the second instruction is for use of a third virtual desktop deployed on the third edge node; and
   sending the second instruction to the third edge node.

7. The method according to claim 1, wherein the resources comprise at least one of:
   computing resources;
   storage resources; and
   network bandwidth.

8. An electronic device, comprising:
   a processor; and
   a memory coupled to the processor, the memory having instructions stored therein that, when executed by the processor, cause the electronic device to execute actions comprising:
   receiving, at a first edge node in a plurality of edge nodes, an instruction from a first set of input devices in a plurality of peripheral devices, wherein the instruction is for use of a first virtual desktop deployed on the first edge node;
   using the first virtual desktop based on the instruction by using resources at the first edge node; and sending data to an output device in the plurality of peripheral devices, wherein the data is associated with the use of the first virtual desktop.

9. The electronic device according to claim 8, wherein using the first virtual desktop based on the instruction comprises at least one of:
processing the instruction using a driver corresponding to the first set of input devices;
authenticating the first set of input devices based on the instruction; and
identifying an input device in the first set of input devices that is associated with a first user based on the instruction.

10. The electronic device according to claim 8, wherein the actions further comprise:
sending, in response to a level of the resources at the first edge node being below a first threshold, state data of the first virtual desktop that is being used to a second edge node in the plurality of edge nodes, wherein the state data is used to reconstruct at the second edge node a second virtual desktop identical to the first virtual desktop.

11. The electronic device according to claim 10, wherein the actions further comprise:
sending the state data of the first virtual desktop that is being used to a cloud.

12. The electronic device according to claim 10, wherein the actions further comprise:
receiving from a scheduling service an indication that the level of the resources at the first edge node is below the first threshold, wherein the scheduling service is deployed on at least one edge node in the plurality of edge nodes or on a cloud external to the plurality of edge nodes.

13. The electronic device according to claim 8, wherein the actions further comprise:
in response to a quality of communication between a third edge node in the plurality of edge nodes and a second set of input devices in the plurality of peripheral devices being below a second threshold, receiving a second instruction from the second set of input devices, wherein the second instruction is for use of a third virtual desktop deployed on the third edge node; and
sending the second instruction to the third edge node.

14. The electronic device according to claim 8, wherein the resources comprise at least one of:
computing resources;
storage resources; and
network bandwidth.

15. A computer program product that is tangibly stored on a computer-readable medium and comprises machine-executable instructions, wherein the machine-executable instructions, when executed, cause a machine to perform a method for using a virtual desktop, the method comprising:
receiving, at a first edge node in a plurality of edge nodes, an instruction from a first set of input devices in a plurality of peripheral devices, wherein the instruction is for use of a first virtual desktop deployed on the first edge node;
using the first virtual desktop based on the instruction by using resources at the first edge node; and
sending data to an output device in the plurality of peripheral devices, wherein the data is associated with the use of the first virtual desktop.

16. The computer program product according to claim 15, wherein using the first virtual desktop based on the instruction comprises at least one of:
processing the instruction using a driver corresponding to the first set of input devices;
authenticating the first set of input devices based on the instruction; and
identifying an input device in the first set of input devices that is associated with a first user based on the instruction.

17. The computer program product according to claim 15, wherein the method further comprises:
sending, in response to a level of the resources at the first edge node being below a first threshold, state data of the first virtual desktop that is being used to a second edge node in the plurality of edge nodes, wherein the state data is used to reconstruct at the second edge node a second virtual desktop identical to the first virtual desktop.

18. The computer program product according to claim 17, wherein the method further comprises:
sending the state data of the first virtual desktop that is being used to a cloud.

19. The computer program product according to claim 17, wherein the method further comprises:
receiving from a scheduling service an indication that the level of the resources at the first edge node is below the first threshold, wherein the scheduling service is deployed on at least one edge node in the plurality of edge nodes or on a cloud external to the plurality of edge nodes.

20. The computer program product according to claim 15, wherein the method further comprises:
in response to a quality of communication between a third edge node in the plurality of edge nodes and a second set of input devices in the plurality of peripheral devices being below a second threshold, receiving a second instruction from the second set of input devices, wherein the second instruction is for use of a third virtual desktop deployed on the third edge node; and
sending the second instruction to the third edge node.

* * * * *